United States Patent [19]

Gonzalez

[11] Patent Number: 4,575,351
[45] Date of Patent: Mar. 11, 1986

[54] TRAINING DOLL

[76] Inventor: Cindy L. Gonzalez, 2105 Manning Ave., Burbank, Calif. 91505

[21] Appl. No.: 574,073

[22] Filed: Jan. 26, 1984

[51] Int. Cl.⁴ .............................................. A63H 3/02
[52] U.S. Cl. ..................................... 446/371; 446/369
[58] Field of Search .............. 446/369, 371, 375, 390, 446/391, 304, 370, 372, 373, 374, 376, 384; 434/256, 267, 369, 371

[56] References Cited

U.S. PATENT DOCUMENTS

| D. 84,732 | 7/1931 | Bennett | 446/369 X |
|---|---|---|---|
| 278,420 | 5/1883 | Eldridge | 446/304 X |
| 1,384,731 | 7/1921 | Richards | 446/376 X |
| 3,319,376 | 5/1967 | Doppelt et al. | 446/382 |
| 4,197,670 | 4/1980 | Cox | 446/369 |
| 4,296,567 | 10/1981 | Kamar | 446/369 |

*Primary Examiner*—Mickey Yu

[57] ABSTRACT

An improved training doll for prospective mothers, sisters, child attendants and the like is provided which includes a life-like torso having the approximate weight, size and appearance of a baby, preferably a newborn infant. The torso has arms and legs articulated to it and including fold lines. The arms and legs are also of the proper approximate size, weight and appearance, to simulate a baby and include means in the form of surface patches for restricting movements thereof to life-like movement directions. Thus, the knees may have patch knee caps and the arms may have elbow patches. The head is also of the approximate size, weight and appearance of a baby and is connected to the torso by a weak preferably tube-like neck which permits the head to freely flop forwardly and rearwardly. This can be accomplished by pinching the neck transversely, as by a sew line, at about the junction with the torso. A transverse fold line may also be in the torso at about the midline and the doll preferably is hollow and filled with weighting material such as sand, which preferably can be added and removed to control the doll's weight. The head may include a nipple-gripping opening simulating a mouth. The doll is simple, durable and effective to train proper handling, care and feeding of infants.

5 Claims, 3 Drawing Figures

U.S. Patent  Mar. 11, 1986  4,575,351
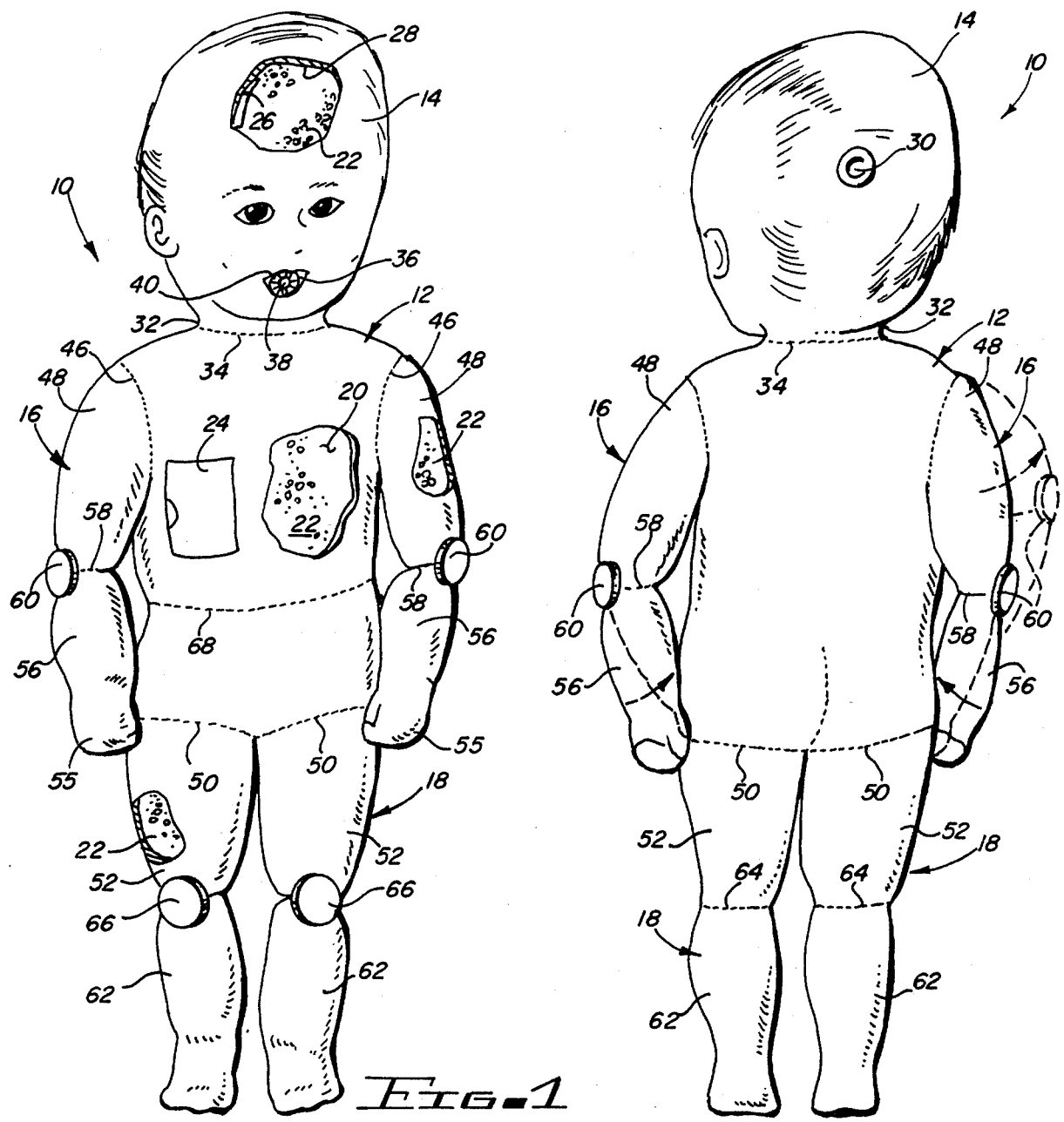
Fig-1
Fig-2
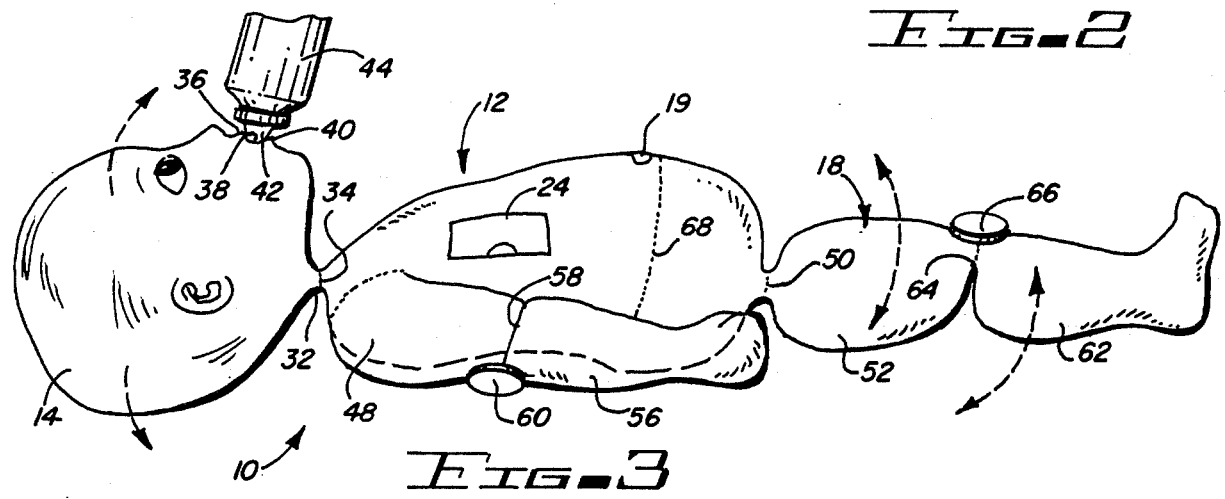
Fig-3

4,575,351

TRAINING DOLL

BACKGROUND OF THE INVENTION

1. Field of the Invention

The present invention generally relates to training aids and, more particularly, to an improved infant care training aid in the form of a doll.

2. Prior Art

Dolls have been popular for many centuries because they give young girls an opportunity to have fun by playing mother. In so doing, girls are also learning how to handle infants and many are later called on to assist their mothers in the handling and feeding of infant brothers and sisters. Prospective mothers in the latter stages of their pregnancy also occasionally practice baby care on dolls. However, conventional dolls are usually light in weight, have stiffly moveable arms, legs and heads and are not of the size and true appearance of newborne infants, so that proper infant care training with such dolls is very difficult and usually not achieved.

Inasmuch as many physical injuries which occur to newborne infants can be traced to improper support of their heads and limbs, there is a need for an infant care training doll which provides the trainee with the proper size, weight, appearance and feel of a newborne infant and its component parts and which also has properly moveable limbs and the neck of which provides the typical very weak head support of the newborne infant. Such a doll preferably should also permit insertion of the nipple of a baby bottle, so that infant feeding can be practiced on the doll. It would also be desirable to be able to adjust the dolls weight to simulate the very newly born, as well as somewhat older infants. The doll should be inexpensive, durable and easily made and used.

SUMMARY OF THE INVENTION

The improved training doll of the present invention satisfies all the foregoing needs. The doll is substantially as set forth in the Abstract above. Thus, it comprises a life-like baby having the approximate weight, size, feel and appearance of a baby, preferably a newborne infant. The torso has the arms, head and legs articulated to it. The head is connected thereto by a weak neck which is sewn transversely to the torso so that the head flops easily forward and backward, as in a real infant, necessitating head support when handling the doll. The legs and arms can be generally tubular and dangle from the torso, they are connected thereto by sew lines and their component parts are interconnected by sew lines and/or fold lines. Their movements are restricted to life-like movements by the presence of buttons or patches attached thereto and to the torso. Thus, the legs and arms have knee caps patches and elbow caps. A fold line can also be provided across the front of the torso to permit some forward bending of the torso.

The torso, legs, arms and head are filled with sand or other weighting material, the amount and nature of which preferably can be controlled by access thereto through an openable closure in the torso and/or head. If other weights are used, they should preferably be large enough to prevent ingestion by a child. Thus, the doll can be variously weighted, for example, to simulate a 6 lb. to 9 lb. newborne infant, with the head having the disproportionately heavy ungainly weight normally associated with such small infants.

The doll can also be provided with a nipple-gripping mouth opening, so that infant bottle feeding can be practiced while cradling or otherwise balancing the doll to protect its head and limbs. The doll is simple, durable inexpensive and highly effective to train prospective mothers and others who expect to handle infants. Other features of the doll of the present invention are set forth in the following detailed description and accompanying drawings.

DRAWINGS

FIG. 1 is a schematic front elevation of a preferred embodiment of the improved training doll of the present invention;

FIG. 2 is a schematic rear elevation of the doll of FIG. 1; and,

FIG. 3 is a schematic side elevation of the doll of FIG. 1, shown with a feeding bottle inserted by its nipple into the mouth of the doll for practicing infant bottle feeding.

DETAILED DESCRIPTION

FIGS. 1-3

Now referrring more particularly to FIGS. 1-3 of the accompanying drawings, a preferred embodiment of the improved training doll of the present invention is schematically depicted therein. Thus, doll 10 is shown, which comprises a torso or main body 12, and a head 14, a pair of arms 16 and a pair of legs 18 connected to torso 12. Torso 12, head 14, arms 16 and legs 18 can be fabricated of any suitable material which is life-like in appearance. Thus, they can be of pink or flesh-toned rubber, plastic, cloth, or the like, suitably configured to closely resemble a human infant. Doll 10 is preferably of the same size, shape and weight as a newborne infant. In this regard doll 10 defines a hollow interior 20 within which a preferably granular pourable weighting material 22, such as sand, gravel, plastic pebbles, beads or the like, is disposed to occupy head 14, arms 16, torso 12 and legs 18. It will be understood that, instead, strips of lead or lead shot, cement strips, chunks, beads or chips, wood chips, ceramic beads, etc. could be used in place of the described weighting material. If desired, access to the weighting material 22 can be provided through an openable trap door 24 or other type of closure, for example, in torso 12 as shown in FIG. 1. Thus, it is preferred that the weighting material 22 be freely pourable into and from at least torso 12 of doll 10 so as to be easily changed in type and/or amount in order to be able to vary the doll's weight to closely simulate that of an infant of the desired age.

Inasmuch as the head of an infant is proportionately heavier than other parts of its body, head 14 may include in its own interior 26 special weights 22 of lead, etc. attached to the interior surface 28 of head 14, as by adhesive, staples, etc. Moreover, head 14 can be provided with its own separate openable closure 30 providing access to its interior 25 so that weighting material 22 used in head 14 can be of a heavier type than that of torso 12, arms 16 and legs 18.

It will be understood that interior 25 is isolated from interior 20 because head 14 is attached to torso 12 by a hollow tubular neck 32 which is directly connected to torso 12 at a transverse sew line 34, so that neck 32 is preferably pinched totally shut at that point. Sew line 34 allows head 14 to freely flap forwardly and rearwardly (FIG. 3) in the natural manner of a newborne infants head supported on a weak spindly neck. Therefore, much needed practice is afforded by doll 10, particularly in requiring the holding of the doll's head 14 while handling doll 10, just as is required to prevent injury to a newborne infant.

Head 14 may also be provided with the features of an infant, including a mouth 36, which preferably is fitted with a nipple-receiving opening 38. Opening 38 preferably is defined by an iris-shaped, flexible, resilient, nipple-gripping ring 40 of rubber, plastic, or the like, so that when the nipple 42 of a feeding bottle 44 (FIG. 3) is inserted into opening 38, ring 40 will hold it fast, permitting practice in the feeding of newborne infants. This is important because mothers of newborne infants frequently have trouble balancing the infant with proper head support, while feeding it from a bottle.

Torso 12 has generally tubular arms 16 and legs 18 directly connected to it, preferably by longitudinal sew lines 46 for the upper portion 48 of arms 16 and transverse sew lines 50 for the upper portion 52 of legs 18. Torso 12 can include a belly-button 19.

Lower portions 56 of arms 16 preferably are connected to upper portions 48, as shown in FIG. 1 by sew lines 58 which extend front to rear, and the movement of portions 56 is limited by buttons 60 applied over sew lines 58, so that arms 16 move in a truely life-like manner. Similarly, lower portions 62 of legs 18 are connected to upper portions 52 thereof by transverse sew lines 64, and the movement of portions 62 is limited by knee cap buttons 66 applied over sew lines 64, so that legs 18 move in a life-like manner. It will be understood that beads, strips, etc., (not shown) could be substituted for the described buttons to provide the same function.

The described articulation of arms 16 and legs 18 is important, because the uncontrolled, life-like dangling and flopping of arms 16 and legs 18 closely simulate those of a newborne baby who has little coordination. Thus, they afford good practice in handling these limbs along with the torso and head in a manner which will prevent their injury. A helpless infant is ungainly and some considerable practice is needed in picking it up, holding it, feeding it, burping it, laying it down, changing its diaper, etc., without injuring it or making it uncomfortable. Doll 10 affords ample opportunity for a prospective mother to practice these techniques safely and efficiently.

It will be understood that because arms 16 and legs 18 are separated from torso 12 by sew lines, as described above, they should be prefilled with weighting material 22 before sewing lines 46, 50, 58 and 64 to form their upper and lower portions and connect them to torso 12.

If desired, a transverse fold line 68 may also be provided across the front of torso 12 at the waist-line in order to permit the upper half of torso 12 to be bent forward relative to the lower half thereof. This increases the life-like mobility of doll 10 and further improves the efficiency of doll 10 as a training device for baby handling. Other advantages of doll 10 are as set forth in the foregoing.

It will be understood that doll 10 can be of any suitable size, proportions and weight which will closely simulate a human infant of any desired age and that the overall doll weight can be changed, as needed, as can be relative proportion of weight in the head and torso. Various other changes, modifications, alterations and additions can be made in the doll of the present invention, its components and their parameters. All such changes, modifications, alterations and additions as are within the scope of the appended claims form part of the present invention.

What is claimed is:

1. An improved infant care training doll, said doll comprising, in combination:
    (a) a life-like doll having the approximate weight, size and appearance of a baby;
    (b) a torso with head, arms and legs attached to said torso, said torso, head, arms and legs being of the approximate weight, size and appearance of a human baby, and including means which provide for the free directional movement thereof to simulate life-like movement;
    (c) wherein said head is connected to said torso by a weak neck which permits the head to flop freely rearwardly and forwardly with respect to the torso,
    (d) wherein the connections between the torso and head, arms and legs are pinched transversely at about the junction with said torso to allow said head, arms and legs to sharply flop downwardly from said torso when the torso is raised without simultaneously supporting the head, arms and legs, said arms and legs also including pinched portions thereon,
    (e) a plurality of weights,
    (f) cavity means in each of said head, arms and legs adapted to receive and retain a preselected amount of said weights to cause said head, arms and legs to sharply flow downwardly, and
    (g) movement restricting means applied to some of said pinched portions to prevent flopping of a portion of said legs and arms forwardly from said torso.

2. The improved training doll of claim 1 wherein certain of said movement restricting means includes buttons which approximate knee caps in size and location.

3. The improved training doll of claim 2 wherein certain of said buttons restrict the movement of the mid-portions of said arms and legs.

4. An improved infant care training doll, said doll comprising, in combination:
    (a) a life-like doll having the approximate weight, size and appearance of a baby;
    (b) a torso with head, arms and legs attached to said torso, said torso, head, arms and legs being of the approximate weight, size and appearance of a human baby, and including means which provide for the free directional movement thereof to simulate life-like movement;
    (c) wherein said head is connected to said torso by a weak neck which permits the head to flop freely rearwardly and forwardly with respect to the torso,
    (d) wherein the connections between the torso and head, arms and legs are pinched transversely at about the junction with said torso to allow said head, arms and legs to sharply flop downwardly from said torso when the torso is raised without simultaneously supporting the head, arms and legs,
    (e) a plurality of weights,
    (f) cavity means in each of said head, arms and legs adapted to receive and retain a preselected amount of said weights to cause said head, arms and legs to sharply flow downwardly, and (g) wherein each doll includes an openable closure affording access to said weighting material for adjustment of the weight of said head, limbs and torso.

5. An improved infant care training doll, said doll comprising, in combination:
   (a) a life-like doll having the approximate weight, size and appearance of a baby;
   (b) a torso with head, arms and legs attached to said torso, said torso, head, arms and legs being of the approximate weight, size and appearance of a human baby, and including means which provide for the free directional movement thereof to simulate life-like movement;
   (c) wherein said head is connected to said torso by a weak neck which permits the head to flop freely rearwardly and forwardly with respect to the torso,
   (d) wherein the connections between the torso and head, arms and legs are pinched transversely at about the junction with said torso to allow said head, arms and legs to sharply flop downwardly from said torso when the torso is raised without simultaneously supporting the head, arms and legs,
   (e) a plurality of weights,
   (f) cavity means in each of said head, arms and legs adapted to receive and retain a preselected amount of said weights to cause said head, arms and legs to sharply flow downwardly, and
   (g) wherein said doll includes a first openable closure in said torso and a second openable closure in said head.

* * * * *